United States Patent [19]

Peek et al.

[11] 4,054,765
[45] Oct. 18, 1977

[54] PIN-JOINT COUPLING FOR THREE OR MORE INTERRELATED COMPONENTS

[75] Inventors: Henry L. Peek, Brandon; Douglas B. Weatherly, Jackson, both of Miss.

[73] Assignee: Allis-Chalmers Corporation, Milwaukee, Wis.

[21] Appl. No.: 635,160

[22] Filed: Nov. 24, 1975

[51] Int. Cl.[2] .......................................... H01H 33/82
[52] U.S. Cl. .................................................. 200/148 F
[58] Field of Search .......... 200/148 R, 148 B, 148 E, 200/148 F; 74/470; 403/157, 158, 161, 162, 163

[56] References Cited

U.S. PATENT DOCUMENTS

| | | | |
|---|---|---|---|
| 2,096,650 | 10/1937 | Del Rio | 74/470 |
| 2,881,631 | 4/1959 | Riccius | 74/470 |
| 3,030,481 | 4/1962 | Gussow et al. | 200/148 R |
| 3,333,071 | 7/1967 | Oppel et al. | 200/148 R |

Primary Examiner—Robert K. Schaefer
Assistant Examiner—Michael K. Mutter
Attorney, Agent, or Firm—Robert C. Jones

[57] ABSTRACT

A plurality of coaxial pins are cooperatively arranged to provide a pin-joint coupling for three or more interrelated components and provide the capability of removal of one component without disturbing the adjustment and operation of the other components.

5 Claims, 4 Drawing Figures

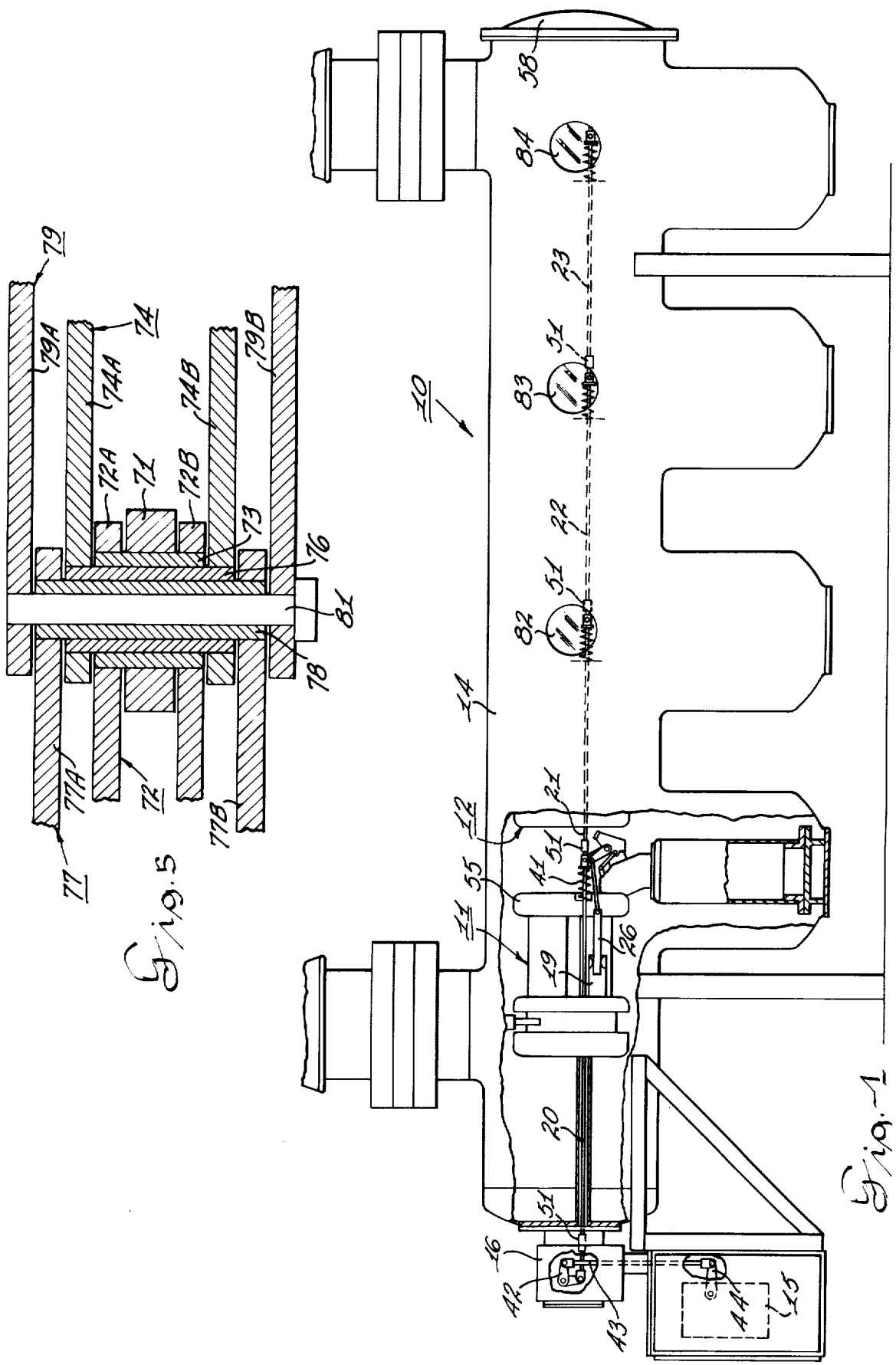

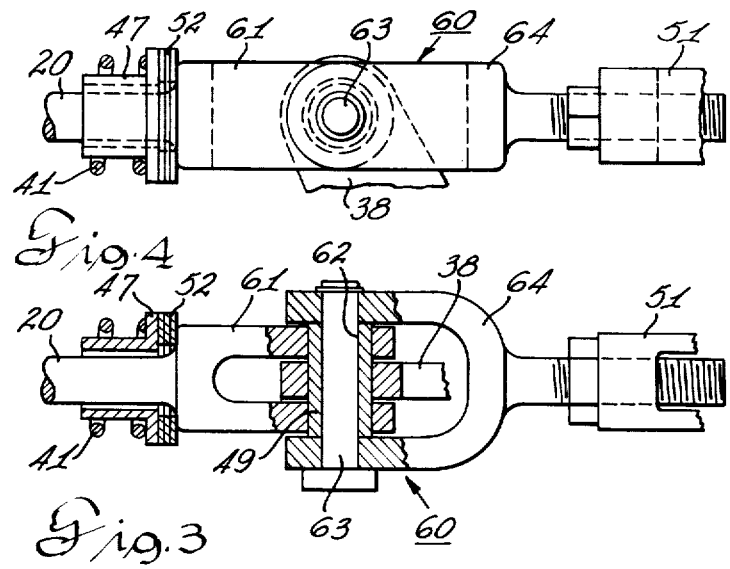
Fig. 4
Fig. 3
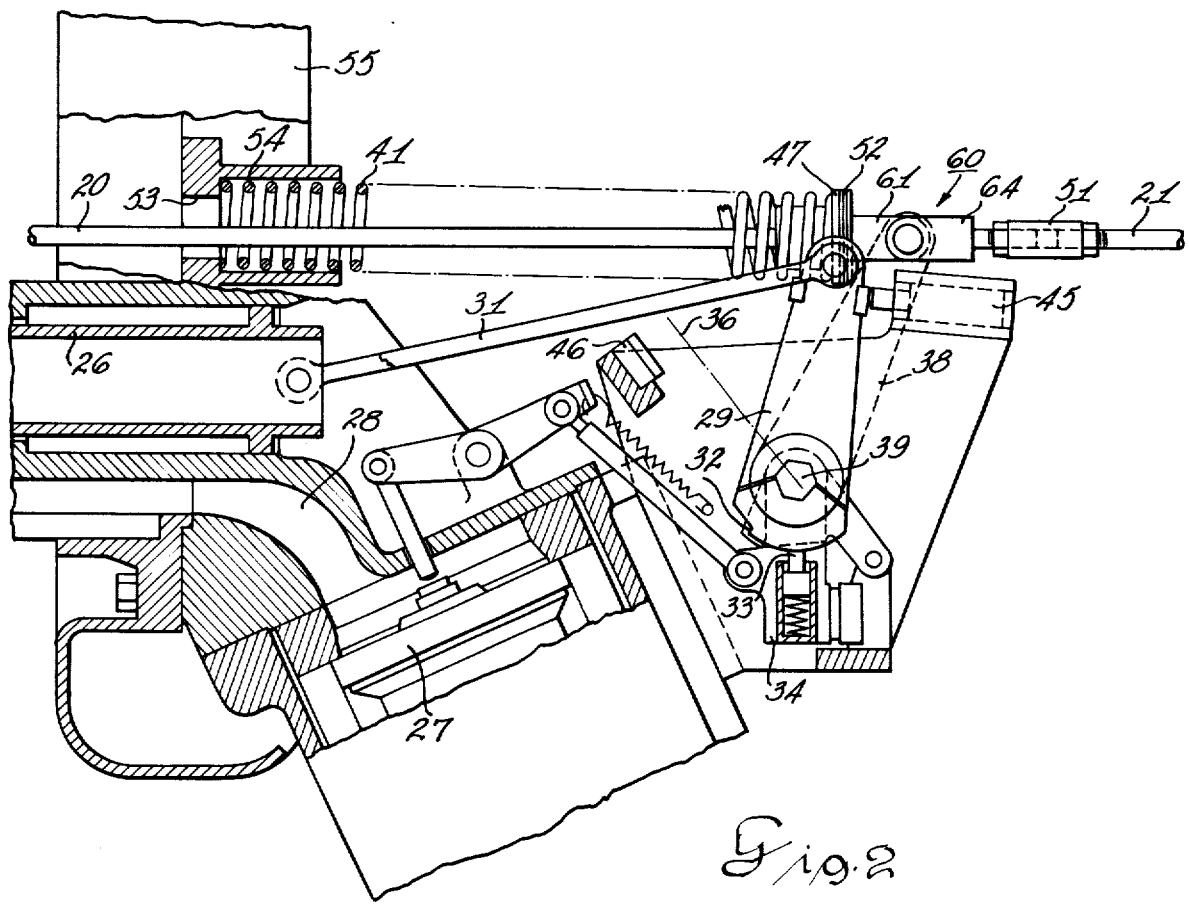
Fig. 2

PIN-JOINT COUPLING FOR THREE OR MORE INTERRELATED COMPONENTS

BACKGROUND OF THE INVENTION

This invention relates to coupling, and in particular to a pin-joint coupling, wherein three or more interrelated components are connected together in articulated operative arrangement. The invention provides a facile means for removing one of the components without disturbing the operative relationship of the other components.

Gas insulated circuit breaker units of extremely high ratings can have three or more circuit interrupters arranged in series relationship. Each interrupter is provided with a pull-rod, with adjacent interrupter pull-rods being connected together for the synchronous operation of all of the interrupters. The gas insulated circuit breaker unit is assembled and adjusted in the factory and shipped as a unit to the site for installation. In the factory, it is usual to assemble each interrupter individually and adjust the position of its associated shock absorber and over-travel stop for proper stroke of its associated contact and also equalization of the angular motion of the operating crank about a vertical line through the axis of the shaft about which the crank pivots. An acceleration spring and its retainer is installed on each pull-rod and connected by coupling to the operating crank. The acceleration spring is adjusted to its proper compressed length for securing of the interrupter contacts. The adjustment of the spring is accomplished by removing the coupling, and removing or adding adjusting washers on the pull-rod so that the compressed length of the accelerating spring is adjusted to its proper value.

After the adjustment of each interrupter is made individually, the interrupters are connected together and inserted as a unit into the enclosure. Since it is most important that all contacts of the associated interrupters make and break simultaneously, the final adjustment of the connecting turn buckles must be made to ensure that all spring loads on all operative cranks reach their over-travel stops at the same time. After this is achieved, all turn buckle adjustments can be locked in place and should not thereafter be changed, either before or after delivery to the customer.

Interrupters are inserted into the tank from one end of the enclosure and removal from the enclosure is usually in the reverse order of insertion. It is essential that provision be made to disconnect interrupters from each other without disturbing either the final adjustment within the enclosure or the final adjustment of the pull-rods between interrupters.

It is the general subject of this invention to disclose a type of pin-joint coupling for three or more components which are interrelated and which not only accomplishes the joining of the related components but also permits disconnecting one component from another component without interrupting the adjusted relationship or operation of the components.

Another object of the present invention is to provide a pin-joint coupling arrangement which provides an articulated connection between components.

Still another object of the invention is to provide a relatively simple pin-joint coupling arrangement for a plurality of interrelated components which facilitates the releasing of one component from the other.

BRIEF DESCRIPTION OF THE DRAWINGS

FIG. 1 is a horizontal view of a gas insulated circuit breaker unit with parts broken away to show one interrupter and operating mechanism;

FIG. 2 is an enlarged detail view of a portion of the circuit interrupter shown in FIG. 1 showing the blast valve and main contact arrangement as well as the accelerating pull-rod connection;

FIG. 3 is a plan view of a pin-joint coupling arrangement shown in relationship to three interrelated components;

FIG. 4 is a side view of the pin-joint coupling arrangement of FIG. 3; and,

FIG. 5 is a modification of the pin-joint coupling arrangement of FIG. 3, wherein a five-component arrangement is shown in connected relationship.

DESCRIPTION OF THE PREFERRED EMBODIMENT

Referring now to FIG. 1, there is shown a high voltage, gas insulated circuit interrupter 10 having in the particular instance four circuit interrupters, two of which 11 and 12 are shown disposed within a gas tight enclosure 14. The gas insulated breaker 10 is provided with an operator 15 which is operatively connected to an end box 16 in which mechanism is contained that operatively connect the operator 15 to the accelerating pull-rod 20 associated with the interrupter 11. The pull-rod arrangement 21 for the interrupter 12 is connected to the right end of the pull-rod 20 associated with the interrupter 11. In a similar manner, the next interrupter to the right of the interrupter 12 also has its pull-rod 22 connected to the right end of the pull-rod 21 associated with the interrupter 12. Then the last or rightward-lymost interrupter has its associated pull-rod 23 connected to the right end of the pull-rod 22. Thus, the operation of all the interrupters is synchronized so that the opening and closing of contacts of all interrupters can be accomplished simultaneously.

In general, each interrupter, such as the interrupter 11, is similar in operation and construction and, thus, a general description of the interrupter 11 will apply to all interrupters of the unit 10. The interrupter 11 includes a movable contact 26 which is movable into and out of engagement with a stationary contact 19. In FIG. 2, a blast valve 27 is displaceable to allow a blast of high pressure gas to be delivered via a U-shaped passage 28 to the arcing area for extinguishing the arc drawn between the contacts on an opening operation. Operation of the contact 26 and the blast valve 27 is effected by movement of a crank 29. The crank 29 is shown in a position after it has operated to move the contact 26 to open position and to release the blast valve 27 for return to its normal closed position. When the crank 29 is pivoted in the counterclockwise direction, a link 31 forces the contact 26 leftwardly into a closed position. At the same time, a cam notch 32 is moved into a position to the right of the displaceable tongue 33 in a latch body 34. Thus, with the crank 29 positioned leftwardly to the position indicated by the broken line 36, the movable contact 26 will have been moved to a closed position and the latch cam groove will be connected to the latch 34 in readiness for an opening operation of the contact 26 and of blast valve 27.

Movement of the crank 29 for operating the contact 26 to a closed position, or for the simultaneous operation of the contact 26 and the blast valve 27 to open positions, is effected by means of the pull-rod 20. The pull-rod 20 at its right end has a pivotal connection with the upper end of an operating crank 38. The operating crank 38 is secured to a horizontal shaft 39 on which the crank 29 and latch body 34 are mounted. The latch body 34 is mounted on the shaft 39 to rotate relative to the shaft. On the other hand, the crank 29 is secured to the shaft 39 so as to be driven by the rotation of the shaft. Thus, pivotal movement of the operating crank 38 in a counterclockwise direction will effect rotation of the shaft 39, which, in turn, causes the pivotal movement of the crank 29 in a counterclockwise direction moving the contact 26 to a closed position and coupling the notch 32 with the latch tongue 33. As the pull-rod 20 moves leftwardly to effect the closing of the contact 26, acceleration spring 41 mounted about the pull-rod 20 is compressed or charged for a subsequent operation in a contact opening movement. As shown in FIG. 1, pull-rod 20 extends to the left and is pivotally connected to a bell crank 42 within the end box 16. The opposite end of the bell crank 42 is pivotally connected to a vertical rod 43, the lower end of which is pivotally connected to an operating lever 44 of the operator 15.

As previously mentioned, it is desirable to assemble each individual interrupter, such as the interrupter 11, in the factory and there adjust the position of its associated shock absorber 45 and its over-travel stop 46 for the proper stroke of the contact 26 and equalization of the angular motion of the crank 38 about a vertical line which passes through the axis of rotation of the shaft 39. When assembling the interrupter, a spring retainer 47 is installed on the pull-rod 20 along with the acceleration spring 41. As viewed in FIG. 3, the pull-rod 20 is bifurcated and is pivotally connected to the upper end of the operating crank 38 by means of a tubular pin or bushing 49. In the assembly process, the spring retainer 47 and the spring 41 are assembled on the pull-rod 20 with the pull-rod then being connected to the upper end of the operating crank 38. This is accomplished by removing the coupling at a turn buckle 51 at the far left end of the pull-rod 20 which permits adjusting washers 52, spring retainer 47 and acceleration spring 41 to be slipped over the pull-rod 20. Thereafter the left end of the pull-rod 20 is inserted through a hole 53, FIG. 2, in a spring retainer 54, formed integrally with an interrupter shield 55. With this accomplished, the left end of the interrupter pull-rod 20 is coupled to a turn buckle 51, FIG. 1, for an operable connection to the operator 15.

To measure the compressed length of spring 41, the pull-rod 20 must be pulled leftwardly, as viewed in FIGS. 1 and 2, until crank 29 touches the over-travel stop 46. The compressed length of the acceleration spring 41 is adjusted to proper value by adding or subtracting washers 52.

After the adjustment of each interrupter is made individually, the turn buckles 51 can be assembled on the left-hand end of each of the pull-rods 20, 21, 22 and 23 to effectively couple all the pull-rods together. The interrupters are preferably arranged with the correct spacing between interrupters established as they would occur within the enclosure 14. With this condition obtained, the pull-rod 20 can be pulled leftwardly to thereby move all of the pull-rods leftwardly simultaneously to compress all of the accelerator springs which are similar to the accelerator spring 41 until the crank 29 of the interrupter 11 touches its over-travel stop 46. It has been found that when crank 29 of interrupter 11 touches its over-travel stop 46, there will be a gap of increasing magnitude at the corresponding point on the remaining interrupters as one proceeds to the right, FIG. 1. This is caused by the variable stretch within the elastic limit of the pull-rods which results from the fact that the pull-rod furthest to the right, as viewed in FIG. 1, is loaded by only one accelerating spring while each succeeding pull-rod to its left has one additional spring load added to it. Since it is most important that all contacts make and break simultaneously, the final adjustment of the turn buckles such as turn buckles 51 associated with the left end of each of the pull-rods 20, 21, 22 and 23 must be made to ensure that with all springs loaded or charged, all of the cranks 29 associated with each individual interrupter reach their over-travel stops 46 at the same time. After this condition is obtained, all turn buckles can be locked in place and should not thereafter be changed, either before or after delivery to a customer.

Since interrupters in the present arrangement are inserted into the tank or enclosure 14 from the right-hand end of the enclosure through a service door 58, it is essential that provision be made to disconnect the interrupters from each other without disturbing either the final adjustment within the interrupter or the final adjustment of the pull-rod between interrupters.

To this end, a novel pin-joint coupling 60 for three or more interrelated components is provided. As shown in detail in FIG. 3, the tubular pin 49 is constructed and arranged to act as a pin connection between the clevis or bifurcated right end of the pull-rod 20 and the operating crank 38. The tubular pin 49 is provided with an axial bore 62 which serves as a bearing for a pin 63 so that clevis or bifurcated end 64 on the left end of the pull-rod 21 can be secured or released from the pull-rod 20 and crank 38 without disturbing the state of compression of the acceleration spring 41 or the adjustment of spring 41, shock absorber 45, over-travel stop 46, or the length adjustment of pull-rods 20 or 21.

To reduce friction between the outside of the tubular pin 49 and crank 38 and clevis 61, and between the wall of the bore 62 of the tubular pin 49 and pin 63, the pin-bushing 49 may be coated on the inside and outside with teflon or it may be made of sintered metal impregnated with a lubricant.

The pin 63 may be locked in place by locking clips or other suitable retainers, or may be threaded into the clevis of the coupling 64. However, it has been found that the accelerating springs 41 through the associated pull-rods apply sufficient force on the pin-bushing 49 and clevis 61 to maintain these members in place with crank 38 while pin 63 is withdrawn and no other securing means is necessary.

In FIG. 5, a modification of the pin-joint coupling of FIG. 3 is disclosed. The arrangement in FIG. 5 discloses how a greater number of interrelated components can be pinned together to provide for removal of components one at a time without disturbing the adjustment of the remaining components and making it possible to continue to operate the remaining components after such removal. As there shown, five components are shown pinned into a single coupling arrangement, each component comprising two identical members spaced apart. Thus, the central component such as a crank 71 is pivotally connected to a pair of arm members 72A and 72B of a single component 72. This connection is effected by means of a pin-bushing 73 having an axial bore. The two components 71 and 72 are shown connected to a pair of arm members 74A and 74B of a single component 74 by means of a pin-bushing 76 that extends through the arms 74A and 74B and through the bore of the pin-bushing 73. Thus, an articulate connection between the components 71, 72 and 74 is effected by means of the pin-bushings 73 and 76. In a similar manner, a pair of arm members 77A and 77B of a single component 77 are connected to the components 71, 72 and 74 by means of another pin-bushing 78 which extends through the arms 77A and 77B and through the bore of the tubular pin-bushing 76. In a similar manner, component 79, having a pair of spaced apart arm members 79A and 79B, is connected to the components 71, 72, 74 and 77 by means of a pin 81 that extends through the arms 79A, 79B and through the bore of the pin-bushing 78. It can be seen that the release of the component 79 is easily accomplished by simply removing the pin 81 to release the connection between the assembly and the component 79 without disturbing the operating arrangement of all the remaining connected components. This arrangement holds true for the component 77 which may be detached from the remaining assembled components by removal of the pin-bushing 78.

The novel pin-joint coupling for three or more interrelated components is extremely simple in its constructional arrangement but it is particularly efficient in its application, especially in the environment of the gas insulated circuit breaker units such as the unit 10 disclosed in FIG. 1. This is true because access to the interior of the enclosure 14 and to each interrupter is through portholes such as the portholes 82, 83 and 84 and through a similar porthole (not shown) associated at the interrupter 11. With the interrupters assembled in position within the enclosure 14 access for inserting the pin-joint couplings into operative position is only available through the ports 82, 83 and 84. Because of this limited access, the novel pin-joint coupling facilitates the connection of the pull-rods to each other and the pull-rod with its associated operating crank. It is also true that the pin-joint coupling provided herein makes it unnecessary to provide wrenches or other tooling for effecting the connection between the pull-rods, and the pull-rods and the operating cranks, thereby eliminating the danger of accidental dropping of such tooling into the interior of the enclosure 14 which would then require disassembly of the unit to retrieve the tooling.

The embodiments of the invention in which an exclusive property or privilege is claimed are defined as follows:

1. In a gas insulated circuit breaker;
   an enclosure;
   a plurality of circuit interrupters connected in electrical series relationship and disposed within said enclosure;
   a stationary contact and a movable contact associated with each of said circuit interrupters;
   an operating crank associated with each circuit interrupter and operatively connected to effect the movement of said interrupter movable contact between open and closed positions;
   a pull-rod associated with each circuit interrupter;
   an acceleration spring mounted on each pull-rod and operable to store energy therein for effecting a movement of the associated pull-rod in a contact opening movement; a pin-busing disposed in aligned openings formed in the pull-rod and operable to provide an articulated between the pull-rod and the operating crank; and,
   a pin disposed in said pin-bushing and operatively arranged to provide an articulated connection of said pull-rod of the second circuit interrupter with the pull-rod of the adjacent first circuit interrupter.

2. A gas insulated circuit breaker according to claim 1 wherein said pull-rod associated with the first circuit interrupter includes a clevis which is adapted to receive the associated operating crank therebetween and said pin-bushing extends through the interengaged operating crank and the clevis of the pull-rod to effect a pivotal connection therebetween, and said acceleration spring operates through the pull-rod to lock said pin-bushing in operative connecting position.

3. A gas insulated circuit breaker according to claim 3 where the pull-rod associated with the adjacent second circuit interrupter is provided with a clevis adapted to bracket the clevis of the pull-rod of first circuit interrupter and said second pin extends through the one leg of the bracketing clevis and through the first of said pin-bushing and thence through the other leg of the bracketing clevis,
   whereby a pivotal connection is established between the one pull-rod and its associated operating crank and the other pull-rod of the adjacent second circuit interrupter and said second pin may be removed to disengage the pull-rod from the pull-rod and its associated operating crank of the first circuit interrupter without disturbing the operating relationship between the pull-rod and its associated operating crank.

4. In a gas insulated circuit breaker having at least three interrelating disengageable components adapted to be moved in unison;
   first and second components interengaged with each other;
   a first pin having an axial bore engaged with the first and second components to couple the components together for synchronous movement;
   a third component interengaged with the first and second components; and,
   a second pin engaged in the third component and in the bore of said first pin to couple the third component to the first and second components.

5. In a coupling for three or more interrelated movable components;
   a first pin having an axial bore, said first pin being operably engaged with a first and a second components to effect an operative connection between the components; and,
   a second pin engaged with a third component and extending through the bore of said first pin to thereby effectively couple the third component to the first and second components,
   whereby all of the components are effectively coupled together for synchronous movement and the third component may be decoupled from the first and second components without effecting the relationship of the first and second components relative to each other.

* * * * *